(12) United States Patent
Yamamoto et al.

(10) Patent No.: US 10,650,242 B2
(45) Date of Patent: May 12, 2020

(54) INFORMATION PROCESSING APPARATUS, METHOD, AND STORAGE MEDIUM STORING A PROGRAM THAT OBTAIN A FEATURE AMOUNT FROM A FRAME IN ACCORDANCE WITH A SPECIFIED PRIORITY ORDER

(71) Applicant: CANON KABUSHIKI KAISHA, Tokyo (JP)

(72) Inventors: Tatsuya Yamamoto, Tokyo (JP); Sammy Chan, Beecroft (AU)

(73) Assignee: Canon Kabushiki Kaisha, Tokyo (JP)

( * ) Notice: Subject to any disclaimer, the term of this patent is extended or adjusted under 35 U.S.C. 154(b) by 159 days.

(21) Appl. No.: 15/820,474

(22) Filed: Nov. 22, 2017

(65) Prior Publication Data
US 2018/0165521 A1     Jun. 14, 2018

(30) Foreign Application Priority Data

Dec. 9, 2016  (JP) .................................. 2016-239780

(51) Int. Cl.
*G06K 9/00* (2006.01)
*G06K 9/62* (2006.01)
*H04N 5/91* (2006.01)

(52) U.S. Cl.
CPC ......... *G06K 9/00744* (2013.01); *G06K 9/623* (2013.01); *G06K 9/6215* (2013.01); *H04N 5/91* (2013.01)

(58) Field of Classification Search
CPC .... G06K 9/0074; G06K 9/6215; G06K 9/623; H04N 5/91
See application file for complete search history.

(56) References Cited

U.S. PATENT DOCUMENTS

| 8,254,645 | B2* | 8/2012 | Okubo | G06K 9/6228 |
| | | | | 382/106 |
| 8,582,887 | B2* | 11/2013 | Suzuki | G06K 9/00288 |
| | | | | 382/181 |
| 8,738,622 | B2 | 5/2014 | Chan | |

(Continued)

FOREIGN PATENT DOCUMENTS

| JP | 2009-122792 A | 6/2009 |
| JP | 2011-066487 A | 3/2011 |

*Primary Examiner* — Kim Y Vu
*Assistant Examiner* — Molly Delaney
(74) *Attorney, Agent, or Firm* — Venable LLP

(57) ABSTRACT

An information processing apparatus includes at least one processor causing the information processing apparatus to act as a first obtainment unit configured to execute processing for obtaining a first feature amount for each of a plurality of frames, a specification unit configured to specify a priority order of frames for obtaining a second feature amount different from the first feature amount based on the first feature amount obtained by the first obtainment unit, a second obtainment unit configured to execute processing for obtaining the second feature amount from a frame in accordance with the priority order, and a selection unit configured to select, based on the second feature amount obtained by the second obtainment unit, an image processing target frame. The number of frames from which the second feature amount is obtained is fewer than the number of the plurality of frames from which the first feature amount is obtained.

27 Claims, 14 Drawing Sheets

(56) References Cited

U.S. PATENT DOCUMENTS

| | | | | |
|---|---|---|---|---|
| 9,747,496 B2* | 8/2017 | Suzuki | ............... | G06K 9/00362 |
| 2003/0095723 A1* | 5/2003 | Ishizaka | ................ | G06T 3/4007 |
| | | | | 382/298 |
| 2009/0148058 A1* | 6/2009 | Dane | ...................... | H04N 5/145 |
| | | | | 382/251 |
| 2012/0114177 A1* | 5/2012 | Adachi | ............. | G06K 9/00362 |
| | | | | 382/103 |
| 2014/0019594 A1* | 1/2014 | Fujita | ................ | H04N 21/8456 |
| | | | | 709/219 |
| 2014/0064557 A1* | 3/2014 | Hara | ....................... | G06F 3/017 |
| | | | | 382/103 |
| 2015/0116353 A1* | 4/2015 | Miura | .................... | G06T 11/60 |
| | | | | 345/632 |
| 2015/0161468 A1* | 6/2015 | Higa | ................... | G06K 9/4676 |
| | | | | 382/199 |
| 2015/0363635 A1* | 12/2015 | Suri | ................... | G06K 9/00268 |
| | | | | 386/241 |
| 2017/0039427 A1 | 2/2017 | Yamamoto et al. | | |
| 2018/0081908 A1* | 3/2018 | Matsubara | .............. | G06T 7/248 |

\* cited by examiner

FIG. 3

| ID | FIRST FEATURE AMOUNT: FRONT FACE COORDINATES (x, y, w, h) | SECOND FEATURE AMOUNT: ANY-DIRECTION FACE COORDINATES (x, y, w, h) | FIRST SCORE: FRONT FACE | SECOND SCORE: ANY-DIRECTION FACE | KEY FRAME FLAG |
|---|---|---|---|---|---|
| 1 | NO FACE | | 0.0 | | |
| 2 | NO FACE | | 0.0 | | |
| 3 | (0.82, 0.45, 0.14, 0.15) | | 0.63 | | |
| 4 | (0.81, 0.45, 0.15, 0.16) | (0.43, 0.44, 0.17, 0.18)<br>(0.81, 0.45, 0.15, 0.16) | 0.65 | 0.93 | Y |
| 5 | NO FACE | | 0.0 | | |
| 6 | NO FACE | | 0.0 | | |
| 7 | NO FACE | | 0.0 | | |
| 8 | NO FACE | | 0.0 | | |
| 9 | NO FACE | | 0.0 | | |
| 10 | (0.55, 0.46, 0.15, 0.16) | (0.55, 0.46, 0.15, 0.16) | 0.73 | 0.73 | |
| 11 | NO FACE | | 0.0 | | |
| 12 | (0.53, 0.45, 0.25, 0.35) | | 0.84 | | |
| 13 | NO FACE | | 0.0 | | |
| 14 | (0.52, 0.45, 0.33, 0.35) | (0.42, 0.41, 0.33, 0.35) | 0.92 | 0.92 | Y |
| 15 | (0.52, 0.43, 0.29, 0.31) | | 0.89 | | |
| ⋮ | | | | | |
| 24 | (0.43, 0.43, 0.16, 0.17)<br>(0.82, 0.45, 0.14, 0.15) | (0.43, 0.43, 0.16, 0.17)<br>(0.82, 0.45, 0.14, 0.15) | 0.91 | 0.91 | Y |
| 25 | (0.43, 0.44, 0.16, 0.17) | | 0.72 | | |
| 26 | NO FACE | | 0.0 | | |

| FEATURE AMOUNT OBTAINMENT ORDER | FRAME INFORMATION ID |
|---|---|
| 1 | 14 |
| 2 | 24 |
| 3 | 15 |
| 4 | 12 |
| ⋮ | ⋮ |
| 26 | 26 |

| ID | SEGMENT ID | FIRST FEATURE AMOUNT: MOTION AMOUNT | SECOND FEATURE AMOUNT: FACE COORDINATES (x, y, w, h) | FIRST SCORE: MOTION AMOUNT | SECOND SCORE: FACE COORDINATES | CANDIDATE FRAME | KEY FRAME FLAG |
|---|---|---|---|---|---|---|---|
| 1 | 1 | 46 | | 0.54 | | | |
| 2 | 1 | 49 | | 0.51 | | | |
| 3 | 1 | 37 | (0.61, 0.53, 0.21, 0.23) | 0.63 | 0.81 | | |
| 4 | 1 | 26 | | 0.74 | | | |
| 5 | 1 | 11 | | 0.89 | | | |
| 6 | 2 | 8 | | 0.92 | | | |
| 7 | 2 | 9 | | 0.91 | | | |
| 8 | 2 | 13 | NO FACE | 0.87 | 0.0 | | |
| 9 | 2 | 11 | | 0.89 | | | |
| 10 | 2 | 26 | | 0.74 | | | |
| 11 | 3 | 21 | | 0.79 | | | |
| 12 | 3 | 8 | | 0.92 | | | |
| 13 | 3 | 9 | (0.44, 0.41, 0.31, 0.34) | 0.91 | 0.91 | | |
| 14 | 3 | 13 | | 0.87 | | | |
| 15 | 3 | 6 | | 0.94 | | | |
| ... | | | | | | | |
| 24 | 5 | 19 | | 0.81 | | | |

SEGMENT (IDs 1–5), SEGMENT (IDs 6–10), SEGMENT (IDs 11–15)

| ID | SEGMENT ID | FIRST FEATURE AMOUNT: MOTION AMOUNT | SECOND FEATURE AMOUNT: FACE COORDINATES (x, y, w, h) | FIRST SCORE: MOTION AMOUNT | SECOND SCORE: FACE COORDINATES | CANDIDATE FRAME | KEY FRAME FLAG |
|---|---|---|---|---|---|---|---|
| 1 | 1 | 46 | | 0.54 | | | |
| 2 | 1 | 49 | | 0.51 | | | |
| 3 | 1 | 37 | (0.61, 0.53, 0.21, 0.23) | 0.63 | 0.81 | | |
| 4 | 1 | 26 | | 0.74 | | | |
| 5 | 1 | 11 | (0.60, 0.52, 0.22, 0.23) | 0.89 | 0.82 | Y | Y |
| 6 | 2 | 8 | | 0.92 | | | |
| 7 | 2 | 9 | | 0.91 | | | |
| 8 | 2 | 13 | NO FACE | 0.87 | 0.0 | | |
| 9 | 2 | 11 | | 0.89 | | | |
| 10 | 2 | 26 | | 0.74 | | | |
| 11 | 3 | 21 | | 0.79 | | | |
| 12 | 3 | 8 | (0.42, 0.41, 0.33, 0.35) | 0.92 | 0.92 | Y | Y |
| 13 | 3 | 9 | (0.44, 0.41, 0.31, 0.34) | 0.91 | 0.91 | Y | |
| 14 | 3 | 13 | (0.43, 0.41, 0.25, 0.27) | 0.87 | 0.85 | Y | |
| 15 | 3 | 6 | NO FACE | 0.94 | 0.0 | | |
| 24 | 5 | 19 | | 0.81 | | | |

802

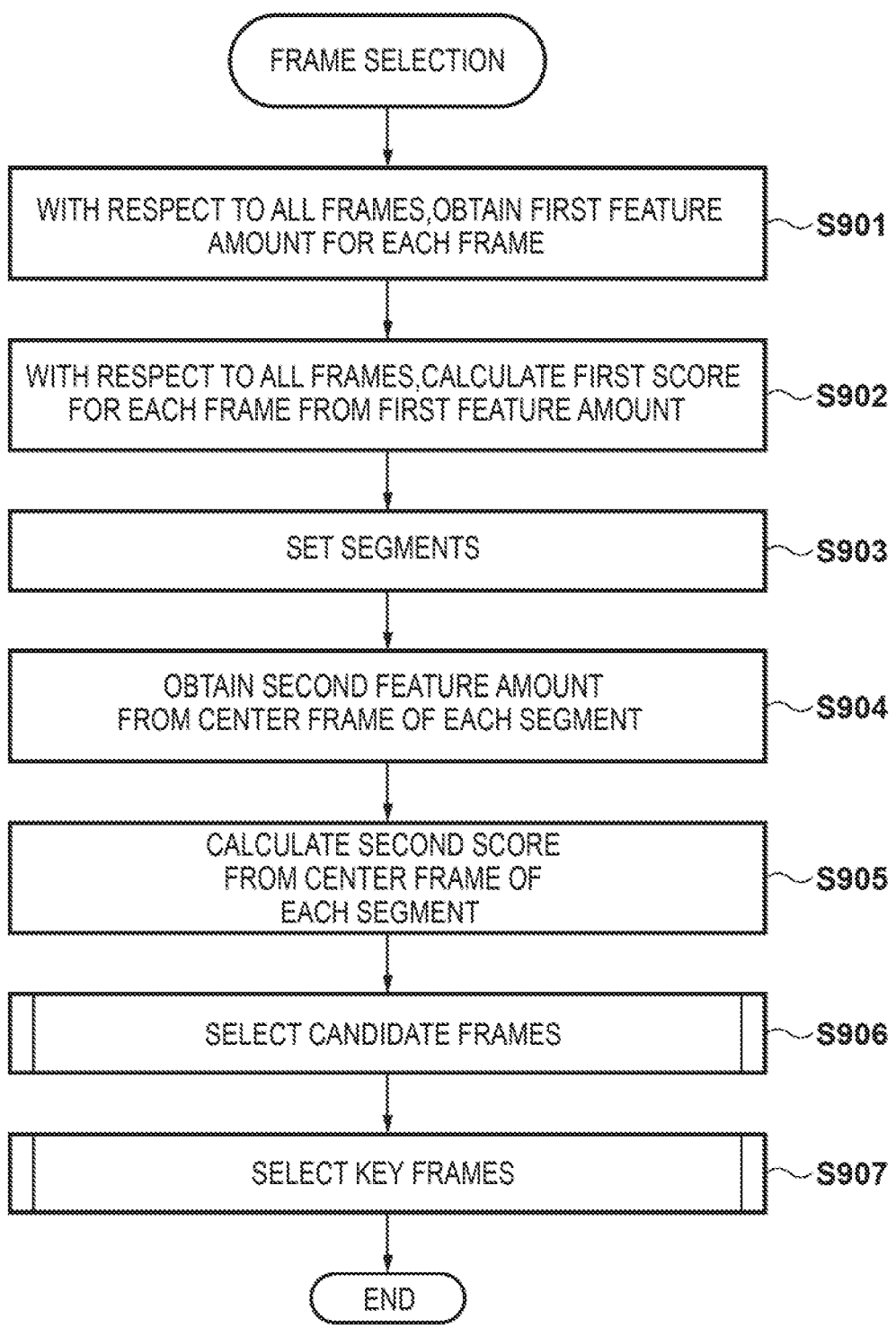

INFORMATION PROCESSING APPARATUS, METHOD, AND STORAGE MEDIUM STORING A PROGRAM THAT OBTAIN A FEATURE AMOUNT FROM A FRAME IN ACCORDANCE WITH A SPECIFIED PRIORITY ORDER

This application claims the benefit of Japanese Patent Application No. 2016-239780, filed Dec. 9, 2016, which is hereby incorporated by reference herein in its entirety.

BACKGROUND OF THE INVENTION

Field of the Invention

The present invention relates to an information processing apparatus for performing image processing, a method, and a storage medium storing a program.

Description of the Related Art

In recent years, in conjunction with the spread of digital cameras and smart phones, because it has become easy to capture moving images, it is increasingly common to amass captured moving images. Rather than just simply viewing the moving images, methods for taking advantage of amassed captured moving images, such as by extracting still images from selected specific frames and using them in a photo book or a slideshow, are spreading. However, a large number of frames are included in a moving image, and there is a large burden in manually selecting, from these, specific frames that meet a purpose. Japanese Patent Laid-Open No. 2011-66487 discusses, as a method of selecting a frame from a moving image, a method of obtaining feature amounts of frames included in a moving image at fixed intervals, and selecting frames based on the obtained feature amounts.

In addition, when generating a photo book or a slideshow, an image is typically selected based on a plurality of factors, such as composition of a person, bokeh or blurring, exposure, and chroma saturation. In such a case, to improve the accuracy of selecting frames from a moving image, a method that uses a plurality of feature amounts instead of one feature amount may be considered. Japanese Patent Laid-Open No. 2009-122792 discusses a method of selecting an optimum picture by combining various feature amounts such as camera-shake blur, photographic subject blur, and poor exposure.

However, when the number of types of feature amounts obtained from one frame is increased to improve the accuracy of a selection, extra time for frame selection is incurred proportionally. Some types of feature amounts are obtained by pixel analysis, or the like, which takes time, and others types are obtained from metadata and require less time. However, when all types of feature amounts are obtained at all times, it takes longer to obtain the feature amounts for each frame. In addition, because a large number of frames are included in a moving image, time taken for processing to select a frame is greatly influenced by time to obtain feature amounts. Consequently, when it takes a long time to obtain feature amounts, a user will have to wait a long time until frames are selected.

SUMMARY OF THE INVENTION

An aspect of the present invention is to eliminate the above-mentioned problems with the conventional technology. The present invention provides an information processing apparatus for improving efficiency of frame selection, a method, and a storage medium storing a program.

The present invention in one aspect provides an information processing apparatus comprising a first obtainment unit configured to execute processing for obtaining a first feature amount for each of a plurality of frames, a specification unit configured to specify, based on the first feature amount obtained by the first obtainment unit, target frames for obtaining a second feature amount for which an obtainment time for one frame is longer than for the first feature amount, a second obtainment unit configured to execute processing for obtaining the second feature amount from the frames specified by the specification unit, and a selection unit configured to select, based on the second feature amount obtained by the second obtainment unit, an image processing target frame.

By virtue of the present invention, it is possible to improve efficiency of frame selection.

Further features of the present invention will become apparent from the following description of exemplary embodiments with reference to the attached drawings.

BRIEF DESCRIPTION OF THE DRAWINGS

FIG. 3 is a view illustrating a frame information management table.

FIGS. 8A and 8B are views illustrating frame information management tables.

FIG. 9 is a flowchart illustrating processing for selecting a key frame.

DESCRIPTION OF THE EMBODIMENTS

Figure 1:
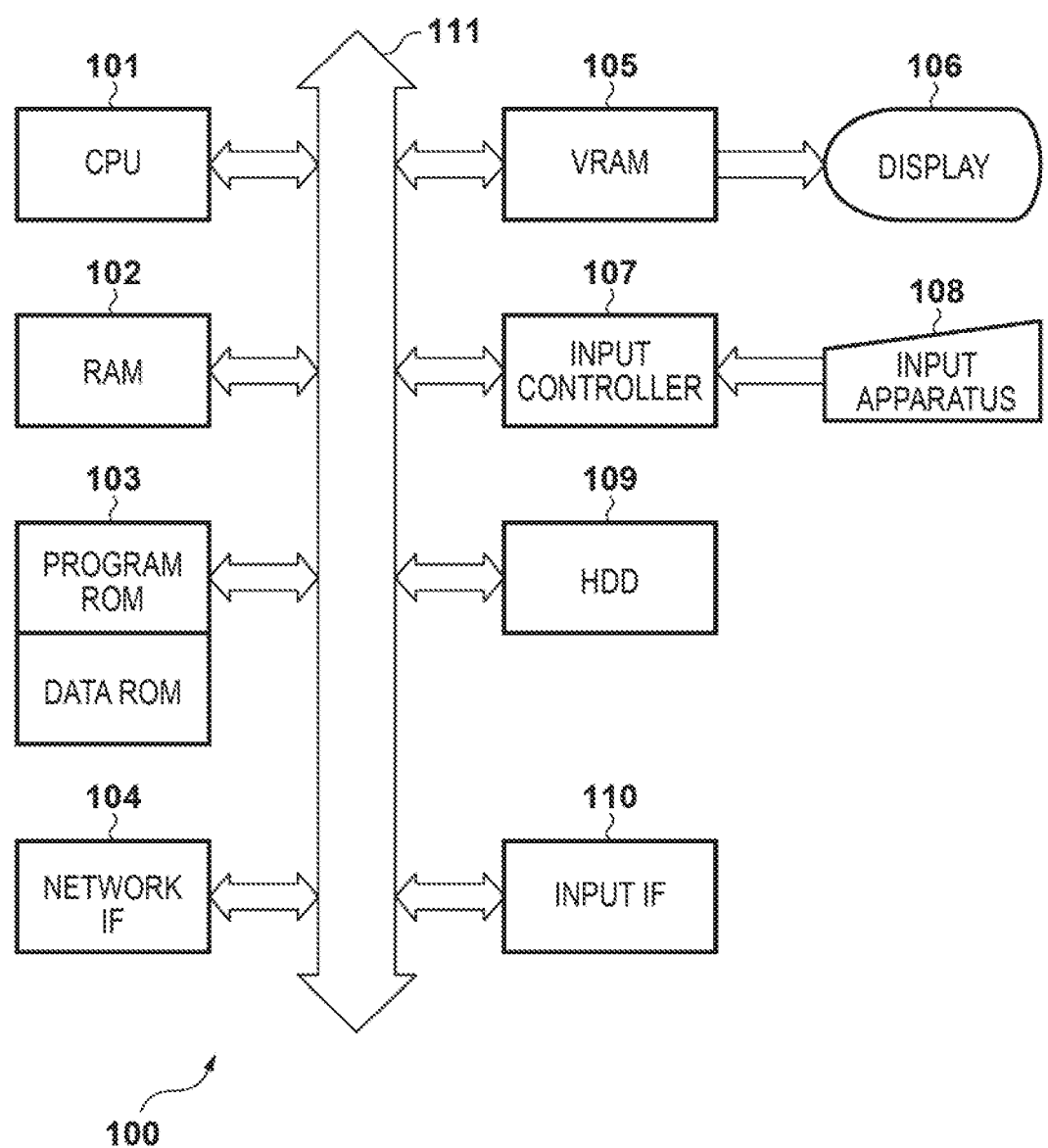
FIG. 1 is a view illustrating a hardware configuration of an information processing apparatus.

Embodiments of the present invention will be described hereafter in detail, with reference to the accompanying drawings. Preferred embodiments of the present invention will now be described hereafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals have been added to the same configuration elements, and an explanation thereof is omitted.

First Embodiment

FIG. 1 is a view illustrating a hardware configuration of an information processing apparatus 100 in the present embodiment. A CPU 101 is a central processing unit for comprehensively controlling the apparatus as a whole. The CPU 101 realizes operation of the present embodiment by executing control of each piece of hardware and processing or calculation of information, based on a control program. A RAM 102 is a general-purpose RAM, and functions as a main memory of the CPU 101, or as a work memory necessary to execute a program to load a program to be executed. A ROM 103 is a general-purpose ROM, and stores a program that specifies a procedure for realizing operation of the present embodiment, for example. The ROM 103 includes a program ROM storing, for example, base software (an OS) that is a system program for performing device control of a computer system, and a data ROM storing information necessary to operate the system, or the like. In addition, an HDD 109 may be used instead of the ROM 103.

A network IF 104 is a network interface, and performs input/output control of data such as moving image data transmitted or received via a network such as a LAN. The network IF 104 has a configuration in accordance with whether it is a wired or wireless network, or the like. A VRAM 105 is a video RAM, and loads an image to be displayed on a screen of a display 106 which is a display apparatus. The display 106 is a display apparatus, and is a liquid crystal display or a liquid crystal panel, for example. An input controller 107 is a controller for controlling an input signal from an input apparatus 108. The input apparatus 108 is an external input apparatus for accepting an operation instruction from a user, and is a touch panel, a keyboard, a pointing device, a remote controller, or the like, for example. The HDD 109 is a hard disk drive. The HDD 109 is used to save data, such as an application program, moving image data, or image data. The application program is a photo book generation application or a movie generation application, for example. An input IF 110 is an interface for connecting with an external apparatus such as a CD(DVD)-ROM drive or a memory card drive, and is used for reading out moving image data captured by a digital camera, for example. An input/output bus 111 is an input/output bus for communicably connecting each of the units described above to each other, and includes an address bus, a data bus, and a control bus, for example.

Figure 2:
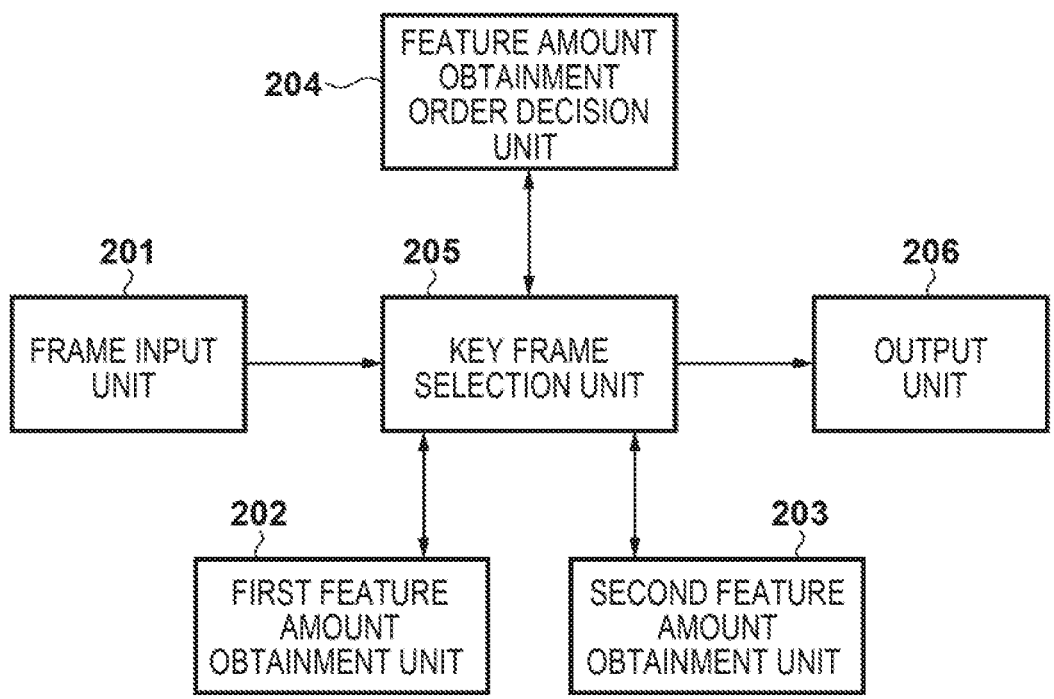
FIG. 2 is a view illustrating a block configuration relating to a photo book generation function.

FIG. 2 is a view illustrating an example of a block configuration relating to a photo book generation function of the information processing apparatus 100. In the present embodiment, the information processing apparatus 100, by executing an application, has a function for generating a photo book based on frames selected from moving image data. In the present embodiment, what is generated based on frames selected from moving image data is explained as a photo book, but it may be other generated material such as a calendar or a single sheet print. Each block of FIG. 2 is realized by the CPU 101 executing an application, for example.

A frame input unit 201 reads moving image data inputted from the input IF 110, extracts images of a plurality of frames that are associated with each other and included in the moving image data, and saves them in the HDD 109. Here, frames taken as targets may be all frames included in the moving image data, or may be only i-frames (intra frames) in a case of using an interframe prediction for compression encoding of the moving image data. In the present embodiment, image data of an i-frame for every 0.5 seconds is inputted and saved in the HDD 109.

For each frame from images of saved frames, a first feature amount obtainment unit 202 detects a forward-facing face as an object, and obtains coordinates and a size (width and height) of the forward-facing face as a first feature amount. For each frame from images of saved frames, a second feature amount obtainment unit 203 detects a face of any direction as an object, and obtains coordinates and a size (width and height) of the face of any direction as a second feature amount. For example, with respect to all directions for which detection is desired, a rotated image is generated for each detection direction, and coordinates are obtained by detecting a forward-facing face with respect to each rotated image. Consequently, processing to detect faces of any direction takes more time than detection of a forward-facing face. In the present embodiment, the second feature amount is a feature amount that takes more time to obtain than the first feature amount.

A feature amount obtainment order decision unit 204 uses the first feature amount obtained from each frame to decide an order for obtaining the second feature amount. A key frame selection unit 205 obtains the second feature amount from frames in accordance with the feature amount obtainment order, and uses the second feature amount to select key frames. An output unit 206 executes image processing for layout of images for generating a photo book by laying out images of selected key frames. In the image processing by the output unit 206, there is no need to use all of the key frames, and images to be used may be further refined from the key frames, and images other than key frames such as a still image captured together with the moving image may be used.

FIG. 3 is a view illustrating an example of a table for managing information of each frame of moving image data. A frame information management table 301 is configured by frame information that includes items of an ID, a first feature amount, a second feature amount, a first score, a second score, and a key frame flag. The ID is identification information for identifying each frame, and is added in an order of extraction from moving image data, for example, in an order of date/time information. The first feature amount is coordinates of a front face obtained by the first feature amount obtainment unit 202, and stores center coordinates (x, y), a width w, and a height h of a normalized face. The second feature amount is the center coordinates, width, and height of a face of any direction obtained by the second feature amount obtainment unit 203, and stores similar information to the first feature amount.

The first score is an evaluation value of the frame that is calculated from the first feature amount, and the second score is an evaluation value of the frame that is calculated from the second feature amount. A description is given later regarding calculation of the evaluation values. The key frame flag is a flag indicating whether a selection as a key frame has been made by the key frame selection unit 205, and indicates selection as a key frame for the frame of an ID where Y is added (the flag is set).

Figures 4, 5:
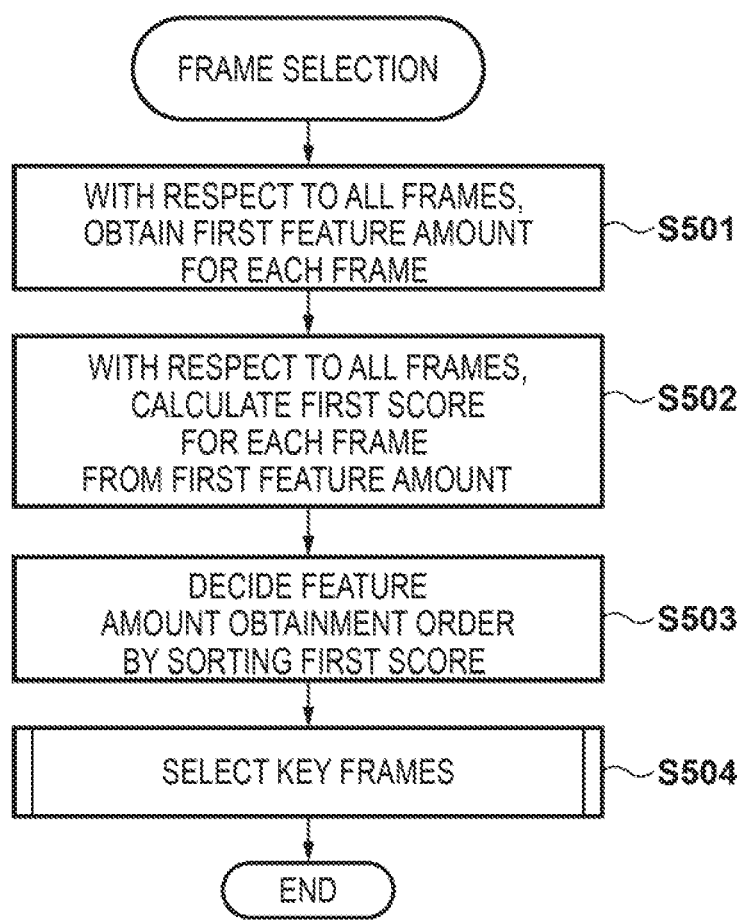
FIG. 4 is a view illustrating frame information for which an order for obtaining a second feature amount has been decided.
FIG. 5 is a flowchart illustrating processing for selecting a key frame.

FIG. 4 is a view illustrating an example of frame information for which an order for obtaining a second feature amount has been decided. A feature amount obtainment order of a frame information table 401 indicates an order for obtaining the second feature amount. A frame information ID indicates the ID for identifying a frame that corresponds to the order for obtaining the second feature amount. The frame information management table 301 of FIG. 3 and the frame information table 401 of FIG. 4 are stored in the HDD 109, for examples, and can be updated dynamically.

FIG. 5 is a flowchart illustrating processing for selecting a key frame from frames of a moving image. Processing of FIG. 5 is realized by, for example, the CPU 101 reading a program stored in the ROM 103 into the RAM 102 and executing it. The processing of FIG. 5 is started when moving image data is designated as a place from where to obtain image data to allocate to a predetermined layout, on a user interface screen for generating a photo book album, for example.

In step S501, the CPU 101, with respect to every frame inputted by the frame input unit 201, obtains the first feature amount for each frame by the first feature amount obtainment unit 202, and stores the first feature amount in the frame information management table 301. In the present embodiment, input targets by the frame input unit 201 are only i-frames, and information for an i-frame for every 0.5 seconds is successively stored in the frame information management table 301.

In step S502, the CPU 101 calculates, as the first score, an evaluation value that considers composition from the face coordinates that are the first feature amount, and stores the first score in the frame information management table 301. In the present embodiment, as a method of calculating the first score, a higher score is calculated the larger the size of a face that is close to center coordinates. For example, from FIG. 3, the face coordinates of the frame of ID 4 are closer to center coordinates (0.5, 0.5) than the face coordinates of the frame of ID 3, and the face size is also larger. Consequently, a score higher than that of the ID 3 frame is stored for the first score of the ID 4 frame.

The first score may be calculated by the following method, for example. First, frames including a front face are extracted from frames of all IDs. For example, frames including front faces in normal positions are extracted. This may be done by extracting frames that include faces similar to a specific front face in a face database stored in the HDD 109 or the ROM 103, for example. A first misalignment amount between center coordinates of the front face and the center coordinates of a target frame is obtained. Then, a second misalignment amount between the size of the front face and a maximum allowed size in the target frame is obtained. From the first misalignment amount and the second misalignment amounts, a parameter whose value increases as each misalignment amount decreases is defined, and the value may be used as the first score. For example, the first score may be calculated as in Equation (1).

$$\text{First score} = 1 - \sqrt{[\{(\text{first misalignment amount/first maximum allowed misalignment amount})^2 + (\text{second misalignment amount/second maximum allowed misalignment amount})^2\}/2]} \quad (1)$$

By Equation (1), the first score is 1 when the first and second misalignment amounts are 0, and the first score is 0 when the first and second misalignment amounts are the maximum allowed misalignment amount. In addition, the first score is 0.8 if the first and second misalignment amounts are respectively 0.2 (20%) of the first and second maximum allowed misalignment amounts.

In addition, instead of the above described method, the first score may be obtained by another method, if a higher score value is obtained the closer a face is to the center coordinates (0.5, 0.5) and as the size increases. In addition, a configuration may be taken to apply a weighting to each of a position and a size of a front face, and a configuration may also be taken to apply a weighting so that a higher score is achieved when a plurality of front faces are detected in one frame than when one face is detected, even if the face sizes are the same.

In step S503, the CPU 101, by the feature amount obtainment order decision unit 204, sorts the IDs into a descending order from a highest first score of the frame information management table 301 to decide a feature amount obtainment order for obtaining second feature amounts. For example, in the feature amount obtainment order of FIG. 4, the frame of ID 14 that has the highest first score of the frame information management table 301 is first in the feature amount obtainment order. The frame of ID 26 that has a low first score is also added to the feature amount obtainment order in FIG. 4, but a configuration may also be taken so as to, if a reliability of the first score satisfies a predetermined criterion, exclude from the feature amount obtainment order frames for which the first score is less than or equal to a threshold value.

In step S504, the CPU 101, by the key frame selection unit 205, selects frames to be key frames by using the decided feature amount obtainment order.

A description is given later regarding the processing of step S504. After the processing of step S504, the processing of FIG. 5 ends.

Step S501 through step S504 is processing for selecting key frames from one piece of moving image data. Consequently, when the frame input unit 201 accepts a plurality of pieces of moving image data, the CPU 101 repeatedly executes step S501 through step S504 on each piece of moving image data. After the processing of FIG. 5, the output unit 206 lays out the images of the selected key frames, and generates the photo book.

Figure 6:
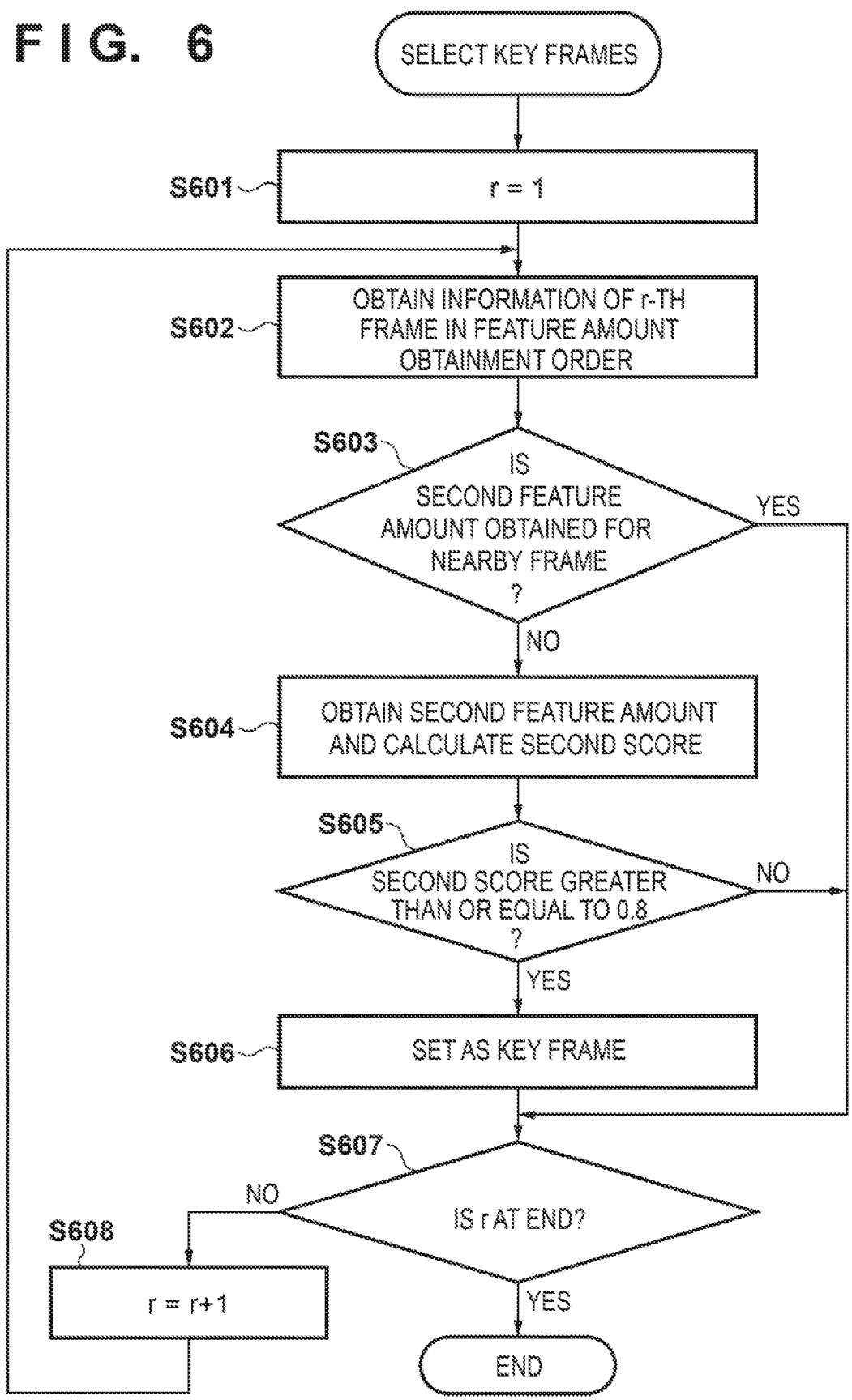
FIG. 6 is a flowchart illustrating processing of step S504.

FIG. 6 is a flowchart illustrating processing of step S504 of FIG. 5. In FIG. 6, key frames are selected from the frames of moving image data by using the feature amount obtainment order.

In step S601, the CPU 101 initializes to 1 a variable r that indicates an order for the feature amount obtainment order reserved in the RAM 102. In step S602, the CPU 101 refers to the frame information table 401 of FIG. 4 to obtain the ID of the r-th frame, with r being the feature amount obtainment order. The CPU 101 then refers to the frame information management table 301 to obtain the frame information for that ID.

In step S603, the CPU 101 determines whether the second feature amount from a frame near the target frame obtained in step S602 is already obtained. Here, a near frame is two frames before or after the target frame obtained in step S602. However, there is no particular limitation to two frames before or after, and, for example, an appropriate frame range, such as four frames before or after, may be changed in accordance with a total number of frames extracted from the moving image data.

If it is determined in step S603 that a near frame has not been obtained, the processing proceeds to step S604, and a key frame determination that is described below is performed. When it is determined in step S603 that a near frame has been obtained, because this means that a key frame determination has already been performed in a near frame that is similar to the target frame, the processing proceeds to step S607 without a key frame determination being performed. In other words, in the present embodiment, a frame determination is not performed near a frame for which a key frame determination has already been performed. By such a configuration, it is possible to cause key frames to be distributed in the order of frames extracted from the moving image data, and it is possible to prevent an unbalance of positions of key frames.

Note that, even if it is determined that the second feature amount is already obtained for a near frame and the near frame is determined to not be a key frame, the possibility that the target frame will be determined to be a key frame is not zero. Consequently, in step S603, a configuration may be taken so as to also determine whether the near frame has already been selected as a key frame. In such a case, when the near frame has already been selected as a key frame, the processing proceeds to step S607, and when the near frame has not already been selected as a key frame, the processing proceeds to step S604.

In step S604, the CPU 101 obtains the second feature amount by the second feature amount obtainment unit 203, calculates the second score from the second feature amount, and stores the second score in the frame information management table 301. For obtainment of the second feature amount, for example, with respect to a predetermined number of all directions for which detection is desired, a rotated image is generated for each detection direction, and center coordinates, a width and a height are obtained by detecting a forward-facing face with respect to each rotated image. The second score is calculated by a similar method as that for the first score. Because the second feature amount obtainment unit 203 supports face orientations for all of a predetermined number of detection directions, there may be a case when face coordinates are newly obtained as with the frame of ID 4 of FIG. 3, for example. In such a case, there may be cases when the second score is not necessarily the same as the first score and the second score has a higher value than the first score, such as when a weighting is set in accordance with a number of detected faces.

In step S605, the CPU 101 determines whether the second score is greater than or equal to a threshold value. Here, 0.8 is used as the threshold value, but there is no particular limitation to 0.8, and another value in accordance with a frame size or a condition may be used. When it is determined that the second score is greater than or equal to the threshold value, in step S606, the CPU 101 sets the current target frame as a key frame, and sets the key frame flag item of the frame information management table 301 of FIG. 3 to "Y". Meanwhile, when it is determined that the second score is not greater than or equal to the threshold value, the processing proceeds to step S607.

In step S607, it is determined whether the r-th frame is the last frame of the feature amount obtainment order of FIG. 4. When it is determined that the r-th frame is not the last frame, in step S608, the CPU 101 increments the variable r by +1, and repeats the processing from step S602. Meanwhile, when it is determined that the r-th frame is the last frame, the processing of FIG. 6 ends. In addition, a configuration may be taken so as to determine in step S607 whether key frames have been set for a required number of frames. A configuration may also be taken so as to end the processing of FIG. 6 when it is determined that key frames have been set for a required number of frames.

Note that, in the present embodiment, the second feature amount obtainment unit 203 takes a face of any predetermined direction as an object, and obtains face coordinates thereof as the second feature amount. However, a configuration may be taken to further obtain various feature amounts such as a smile factor, a chroma, a degree of bokeh or blurring, or the like, and have the second score be an overall evaluation of these feature amounts. In addition, a configuration may also be taken, when saving an image of each frame in the frame input unit 201, to save two types of images having different sizes from one frame. In such a case, a configuration may also be taken so that the first feature amount obtainment unit 202 analyzes the smaller image to obtain the first feature amount, and the second feature amount obtainment unit 203 analyzes the larger image to obtain the second feature amount. In addition, in the present embodiment, the second feature amount is given as a feature amount that takes more processing than the amount of processing for obtaining the first feature amount, but operation of the present embodiment can be applied if the amount of time for obtaining the first feature amount is less than the amount of time for obtaining the second feature amount, even if an amount of processing for obtaining the first feature amount is greater. For example, there are cases where obtainment of the first feature amount is performed by hardware. In such a case, it is possible to restrict (narrow) a number of frames for obtaining the second feature amount, which has a longer obtainment time.

As explained above, by virtue of the present embodiment, a key frame determination is preferentially performed from frames expected to have a high second score, in a frame order (the feature amount obtainment order) from a highest first score that is calculated from a first feature amount. As a result, it is possible to restrict a number of frames targeted for obtainment of the second feature amount, which has a larger amount of processing for obtainment thereof. In addition, in the key frame determination, the second feature amount is obtained to calculate the second score, and frames having a high second score are selected as key frames, preferentially, from frames having high ranking second scores. As a result, it is possible to maintain accuracy for selection of a frame as a key frame, even when the number of frames for obtaining the second feature amount are restricted. Accordingly, it is possible to select key frames at a high speed and with good accuracy, and a user can extract still images from a moving image without having to wait a long time.

With a configuration that uses the first feature amount to exclude in advance frames having a low evaluation, there is a possibility that the exclusion will be mistakenly performed when the accuracy of the first feature amount is low, and, as a result, a key frame cannot be found. However, in the present embodiment, because the order descends to a low level, it is possible to finally find a key frame.

Second Embodiment

In the first embodiment, an explanation was given for a configuration for selecting frames at a high speed and with good accuracy by using a feature amount obtainment order to restrict a number of frames for which to obtain the second feature amount. In the present embodiment, as another configuration for restricting a number of frames for which to obtain the second feature amount, the frames are divided into predetermined segments, and information thereof is used to restrict the number of frames for which to obtain the second feature amount. Hereafter, a description will be given of points that differ from the first embodiment.

Figure 7:
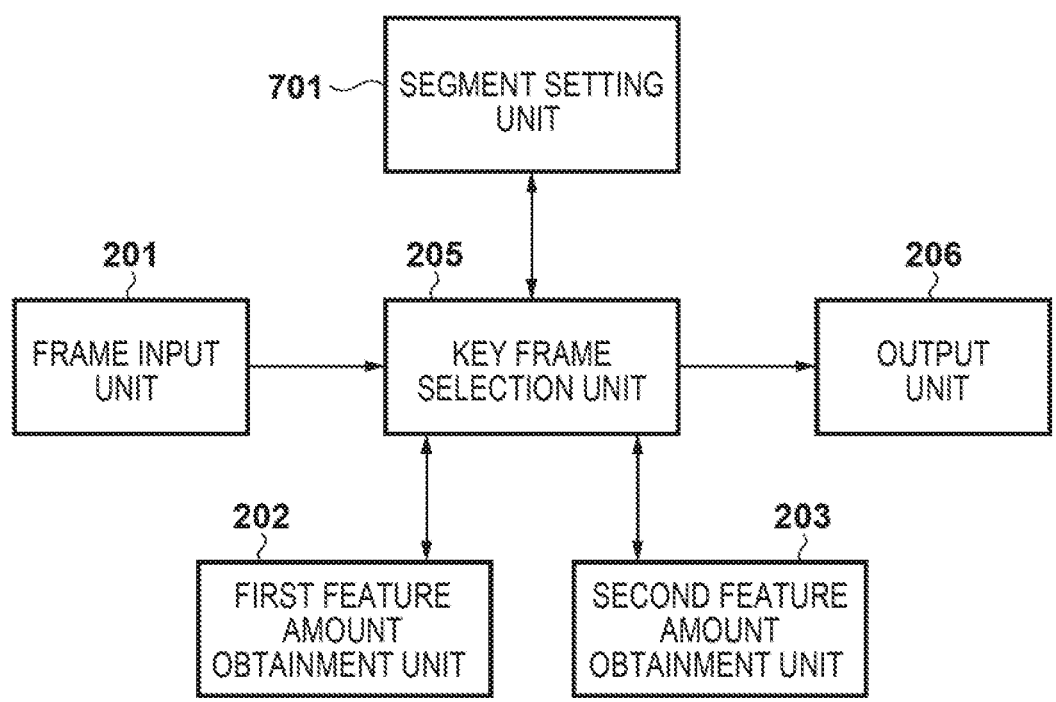
FIG. 7 is a view illustrating a block configuration relating to a photo book generation function.

FIG. 7 is a view illustrating an example of a block configuration related to a photo book generation function of the information processing apparatus 100 in the present embodiment. Explanation regarding the frame input unit 201, the first feature amount obtainment unit 202, the second feature amount obtainment unit 203, the key frame selection unit 205, and the output unit 206 is the same as that in the first embodiment. However, in the present embodiment, it is assumed that the first feature amount obtainment unit 202 obtains, as the first feature amount, information of a motion amount of a camera by using metadata added to a moving image in advance in accordance with a gyroscope sensor of the camera. A segment setting unit 701, by predetermined processing, divides a plurality of consecutive frames included in a moving image into segments on the basis of time information, or the like. Each block of FIG. 7 is realized by the CPU 101 executing an application, for example.

FIGS. 8A and 8B are views illustrating examples of frame information management tables in the present embodiment. A frame information management table 801 is configured by frame information that includes items of an ID, a segment ID, a frame number, a first feature amount, a second feature amount, a first score, a second score, a candidate frame flag, and a key frame flag. The ID is identification information for identifying each frame, and is added in an order of extraction from moving image data. The segment ID is identification information for identifying a segment to which frames belong, for when consecutive frames are divided by the segment setting unit 701. The first feature amount is a motion amount of the camera which is obtained by the first feature amount obtainment unit 202, and stores the magnitude of the motion amount. The second feature amount is the center coordinates, width and height of a face detected from a saved image of a frame, and is the same as a feature amount for a front face that was detected as a first feature amount in the first embodiment.

The first score is an evaluation value of the frame that is calculated from the first feature amount, and the value thereof increases as the motion amount decreases. A configuration may be taken such that the first score is a relative value of the motion amount of a frame, calculated in a range of 0 through 1.0, taking a maximum value among the motion amount of all frames as 1.0, and a minimum value thereof as 0, for example. The second score is the same as the explanation in the first embodiment. A candidate frame flag is a flag for indicating whether a frame is a candidate for a key frame. A key frame flag is a flag for indicating whether a frame is set as a key frame. The frame information management table 801 indicates a state before candidate frame flags and key frame flags are set, and a frame information management table 802 indicates a state after candidate frame flags and key frame flags are set.

FIG. 9 is a flowchart for illustrating processing for selecting key frames from frames of a moving image in the present embodiment. Processing of FIG. 9 is realized by, for example, the CPU 101 reading a program stored in the ROM 103 into the RAM 102 and executing it. The processing of FIG. 9 is started when moving image data is designated as a place from where to obtain image data to allocate to a predetermined layout, on a user interface screen for generating a photo book album, for example. In the present embodiment, the key frame selection unit 205 uses segment information set by the segment setting unit 701 to select frames to be key frames.

In step S901, the CPU 101, with respect to every frame inputted by the frame input unit 201, obtains a motion amount of the camera as the first feature amount for each frame by the first feature amount obtainment unit 202, and stores the first feature amount in the frame information management table 801.

In step S902, the CPU 101 calculates the first score from the first feature amount, and stores the first score in the frame information management table 801. In the present embodiment, because there is a high probability that an image of a frame having a high motion amount is blurred, the first score is calculated so that the value thereof increases as the motion amount decreases.

In step S903, the CPU 101, by the segment setting unit 701, sets in the frame information management table 801 the ID of a segment that each frame belongs to, for all frames. In the present embodiment, segments are divided by a fixed length that is five frames, as illustrated in FIG. 8A. However, a configuration may also be taken to divide by a variable length, such as when dividing a location where a difference of motion amounts is greater than or equal to a threshold value.

In step S904, the CPU 101 obtains a second feature amount from a frame positioned at the center of each segment as a second feature amount that typifies the segment. In step S905, the CPU 101 calculates the second score from the second feature amount of the center frame, and stores the second score in the frame information management table 801. FIG. 8A illustrates an example of a state in which the processing of step S901 through step S905 has been performed, and the second feature amount and the second score has been stored for the frames of ID 3, ID 8, and ID 13, which are center frames of respective segments.

In step S906, the CPU 101 selects candidate frames that are candidates for a key frame. The processing of step S906 is described below in FIG. 10. In step S907, the CPU 101 selects key frames from the candidate frames. The processing of step S907 is described below in FIG. 11.

Figure 10:
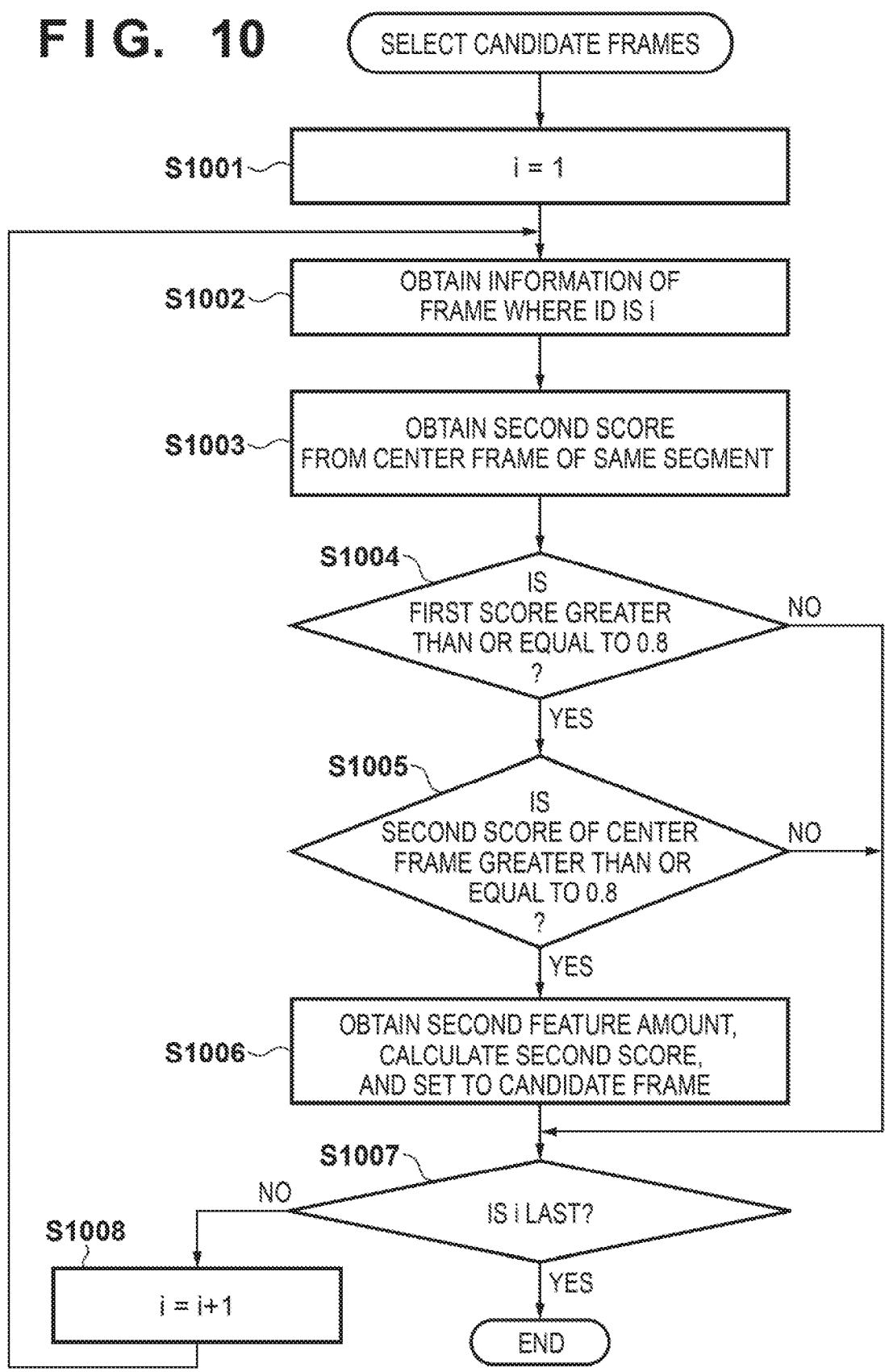
FIG. 10 is a flowchart illustrating processing of step S906.

FIG. 10 is a flowchart illustrating processing of step S906 of FIG. 9. In FIG. 10, information of a segment is used to select a candidate frame that is a candidate for a key frame from frames of a moving image.

In step S1001, the CPU 101 initializes to 1 a variable i that indicates an ID of a target frame and that is reserved in the RAM 102. In step S1002, the CPU 101 refers to the frame information management table 801 of FIG. 8A to obtain frame information of the i-th frame, with i being the ID of the frame. In step S1003, the CPU 101 obtains the second score of a center frame belonging to the same segment as the segment ID of the target frame obtained in step S1002.

In step S1004, the CPU 101 determines whether the first score of the target frame is greater than or equal to a threshold value. Here, 0.8 is used as the threshold value, but there is no particular limitation to 0.8, and another value in accordance with a frame size or a condition may be used. When it is determined that the first score is greater than or equal to the threshold value, the processing proceeds to step S1005, and when it is determined that the first score is not greater than or equal to the threshold value, the processing proceeds to step S1007.

In step S1005, the CPU 101 determines whether the second score of the center frame obtained in step S1003 is greater than or equal to a threshold value. Here, 0.8 is used as the threshold value, but there is no particular limitation to 0.8, and another value in accordance with a frame size or a condition may be used. In addition, a value different than the threshold value of step S1004 may be used. When it is determined that the second score is greater than or equal to the threshold value, the processing proceeds to step S1006, and when it is determined that the second score is not greater than or equal to the threshold value, the processing proceeds to step S1007.

When both threshold value determinations of step S1004 and step S1005 were affirmative, in step S1006, the CPU 101 sets the target frame as a candidate frame. Furthermore, the CPU 101 obtains the second feature amount of the target frame by the second feature amount obtainment unit 203, calculates the second score, and stores the second score in the frame information management table 801. Note that the second score of the center frame may be used as the second score of the target frame, without the second score of the target frame being calculated.

For example, the frame for ID 5 of the frame information management table 802 has a first score that is 0.89 and is greater than or equal to the threshold value. The second score of the center frame of ID 3, which is positioned in the center of the same segment as ID 5 is 0.81, which is greater than or equal to the threshold value. Consequently, the frame of ID 5 is set as a candidate frame in step S1006. Furthermore, the second feature amount of the frame of the ID 5 is obtained, and 0.82, which is the second score thereof that is calculated based on the second feature amount, is stored in the frame information management table 802. When the threshold value determinations of step S1004 and step S1005 are both not affirmative, the processing proceeds to step S1007.

In step S1007, the CPU 101 determines whether the frame having the frame ID of i is the last frame of the frame information management table 801. Here, when it is determined not to be the last frame, in step S1008 i is incremented by +1 and processing repeats from step S1002. Meanwhile, when it is determined that the i-th frame is the last frame, the processing of FIG. 10 ends.

Note that, in the present embodiment, in step S1004 and in step S1005, it is determined whether or not the values of the first score of the target frame and the second score of the center frame are respectively greater than or equal to a threshold value. In addition, a configuration may be taken so as to calculate an overall evaluation value, such as a total of the first score of the target frame and the second score of the center frame, and use the evaluation value to determine whether to set a candidate frame. In addition, instead of directly using the second score of the center frame, a value separately calculated by linear interpolation, or the like, may be used as the second score.

Figure 11:
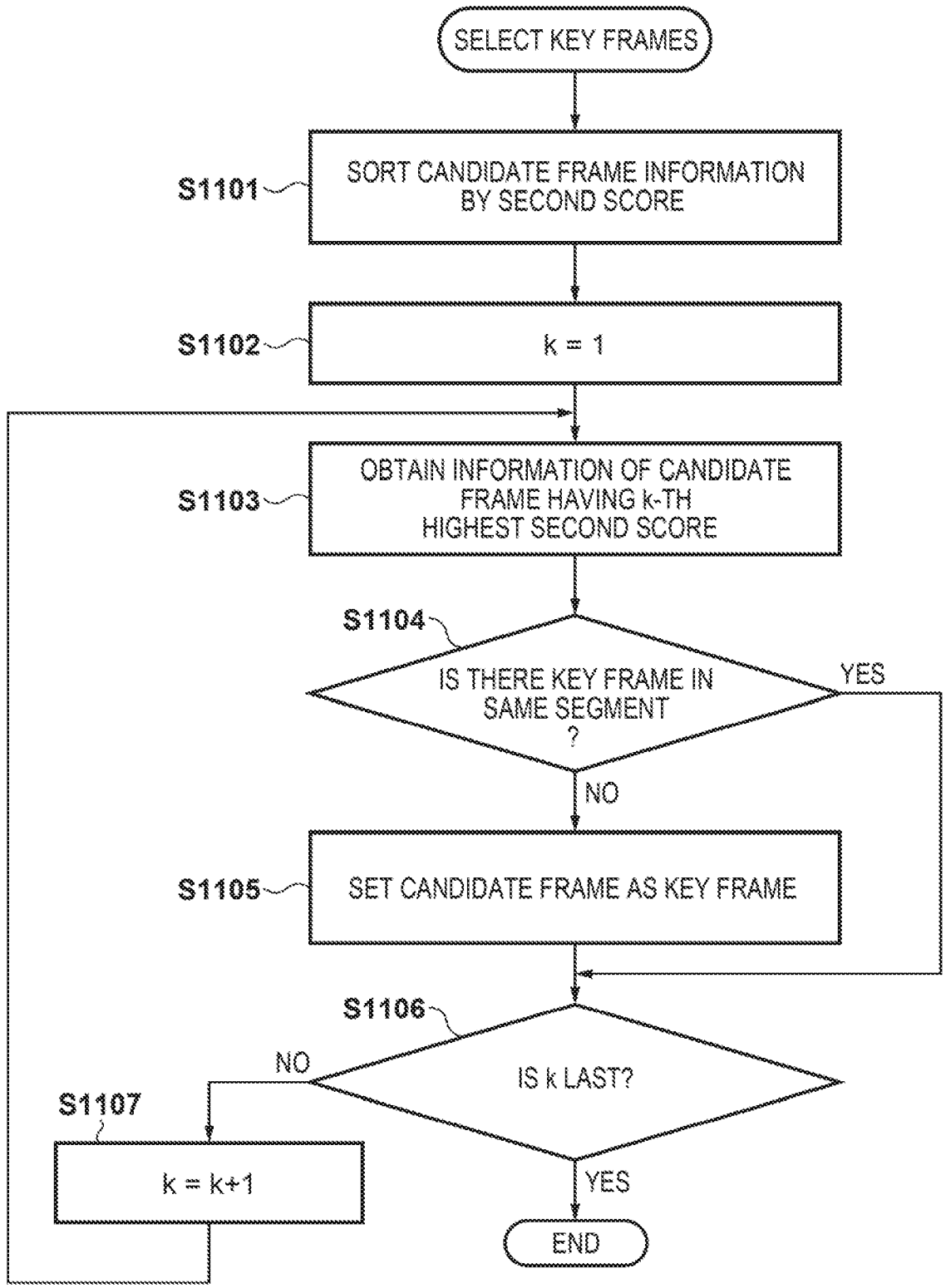
FIG. 11 is a flowchart illustrating processing of step S907.

FIG. 11 is a flowchart illustrating processing of step S907 of FIG. 9. In FIG. 11, key frames are selected from candidate frames.

In step S1101, the CPU 101 obtains information of all frames for which the candidate frame flag is set, and sorts them by the second score. In step S1102, the CPU 101 initializes to 1 a variable k that indicates a target candidate frame and that is reserved in the RAM 102. In step S1103, the CPU 101 obtains information of the candidate frame having the k-th highest second score.

In step S1104, the CPU 101 determines whether a key frame is already present in the segment having the same segment ID as a target candidate frame. When it is determined that a key frame is not present in this segment, the processing proceeds to step S1105, and the CPU 101 sets the target candidate frame as a key frame. After the processing of step S1105, or when it is determined in step S1104 that a key frame is present, the processing proceeds to step S1106.

In step S1106, the CPU 101 determines whether the k-th candidate frame is the last one out of the sorted order. When it is determined that the k-th frame is not the last frame, the processing proceeds to step S1107, and the CPU 101 increments the variable k by +1, and repeats the processing from step S1103. Meanwhile, when it is determined that the k-th frame is the last frame, the processing of FIG. 11 ends.

By virtue of the present embodiment, because there is a high probability that images of frames in the same segment are similar, when a key frame is not already present in the same segment in accordance with a determination of step S1104, the candidate frame is set as a key frame. Accordingly, it is possible to prevent similar candidate frames in the same segment from being both set as key frames.

As another configuration, assuming that it is desirable to select frames if they have a high score regardless of whether they are in the same segment, an adjustment may be made to reduce the second score based on a number of key frames present in the same segment. As a result of this adjustment, when it determined that the adjusted second score is still greater than or equal to the threshold value, the frame may be set as a key frame. In addition, instead of selecting key frames in an order from a highest second score, a third score may be calculated from a feature amount different than the second feature amount, and key frames may be selected in an order from a highest third score.

As explained above, by virtue of the present embodiment, by using information for segments resulting from dividing frames and restricting a number of frames for which to obtain the second feature amount, it is possible to select frames at a high speed and with good precision, and a user can extract still images from a moving image without waiting a long time. In addition, even when first scores are all high with no difference and ranking is difficult, by using a second score calculated from the second feature amount of a center frame of a segment, it is possible to restrict the number of frames.

Third Embodiment

In the first and second embodiment, key frames are selected in order to extract, from moving image data, images for laying out in a photo book. In the present embodiment, information of selected key frames is used to select a scene (a specific segment) to highlight out of moving image data. Hereafter, a description will be given of points that differ from other embodiments.

Figure 12:
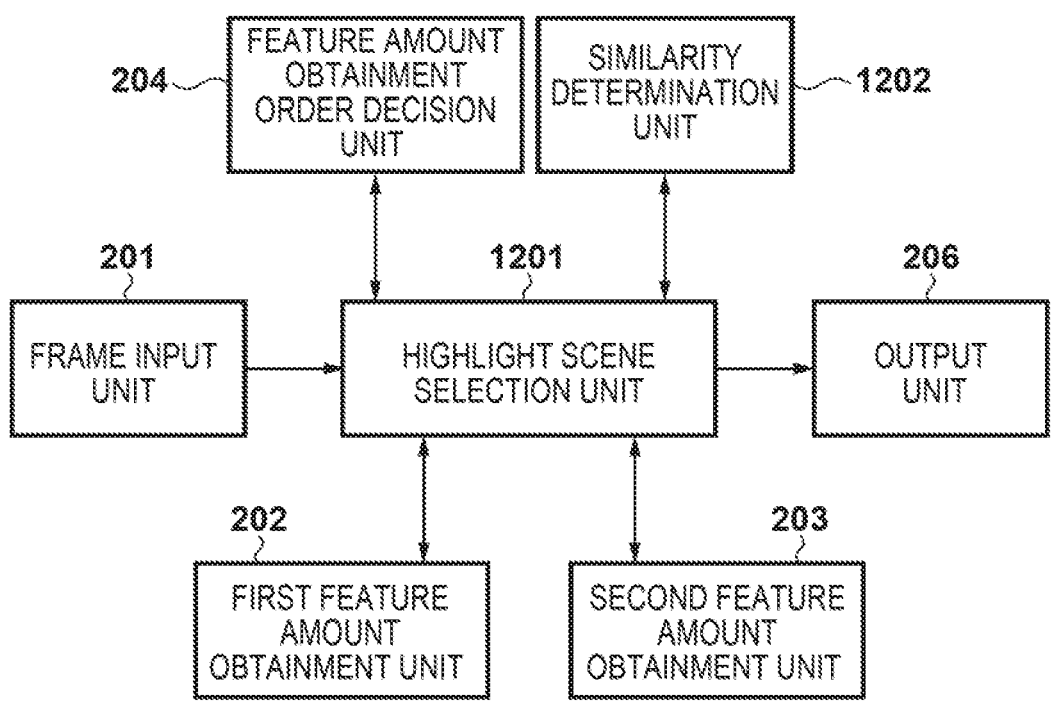
FIG. 12 is a view illustrating a block configuration relating to a movie generation function.

FIG. 12 is a view illustrating an example of a block configuration relating to a movie generation function of the information processing apparatus 100. An explanation regarding the frame input unit 201, the first feature amount obtainment unit 202, the second feature amount obtainment unit 203, the feature amount obtainment order decision unit 204, and the output unit 206 is the same as that in the first embodiment. However, in the present embodiment, the output unit 206 extracts a moving image of the segment for a selected highlight scene, and outputs it as a highlight movie. A highlight scene selection unit 1201 selects key frames similarly to the key frame selection unit 205 of FIG. 2, and also uses information of the key frames to select a highlight scene. A similarity determination unit 1202 analyzes two images, and determines whether images of two frames are similar, based on information such as a color histogram. Each block of FIG. 12 is realized by the CPU 101 executing an application, for example.

Figure 13:
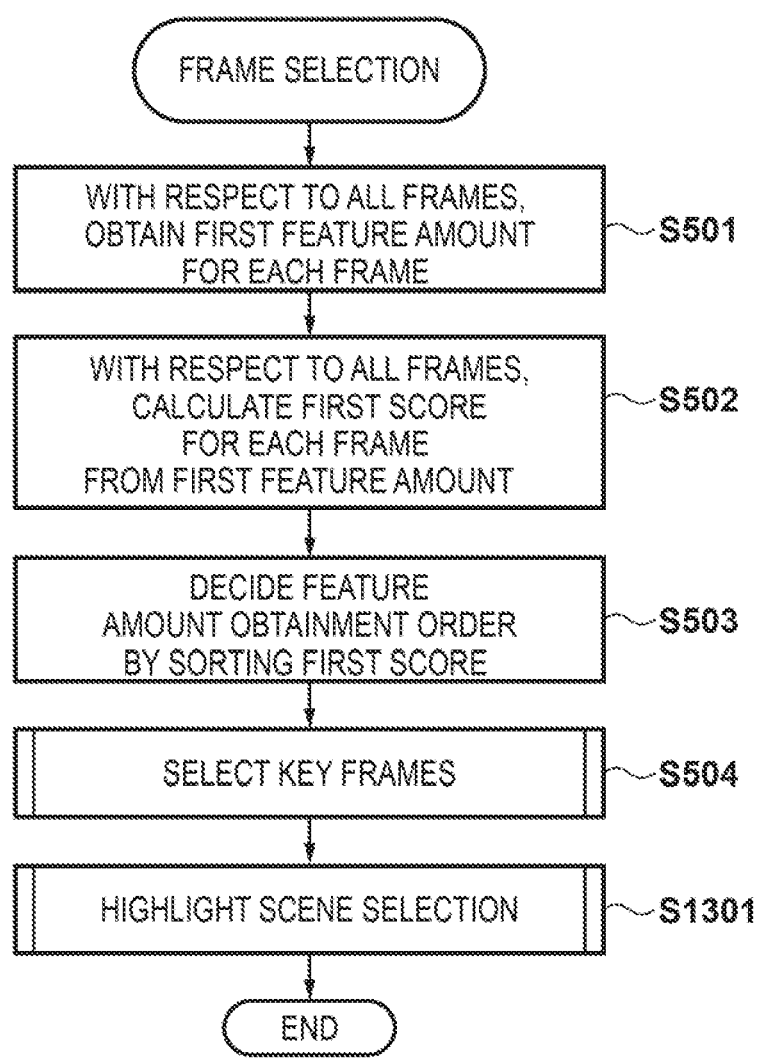
FIG. 13 is a flowchart illustrating processing for selecting a key frame.

FIG. 13 is a flowchart illustrating processing for selecting a key frame from frames of a moving image. Processing of FIG. 13 is realized by, for example, the CPU 101 reading a program stored in the ROM 103 into the RAM 102 and executing it. In the processing of FIG. 13, the highlight scene selection unit 1201 selects frames to be a highlight scene out of frames of the moving image data inputted from the frame input unit 201.

An explanation for step S501 through step S504 is the same as that in the first embodiment. In the present embodiment, the processing proceeds to step S1301 after the processing of step S504. In step S1301, the CPU 101 uses information of the key frame selected in step S504 to select frames to be a highlight scene. The processing of step S1301 is described below in FIG. 14.

Figure 14:
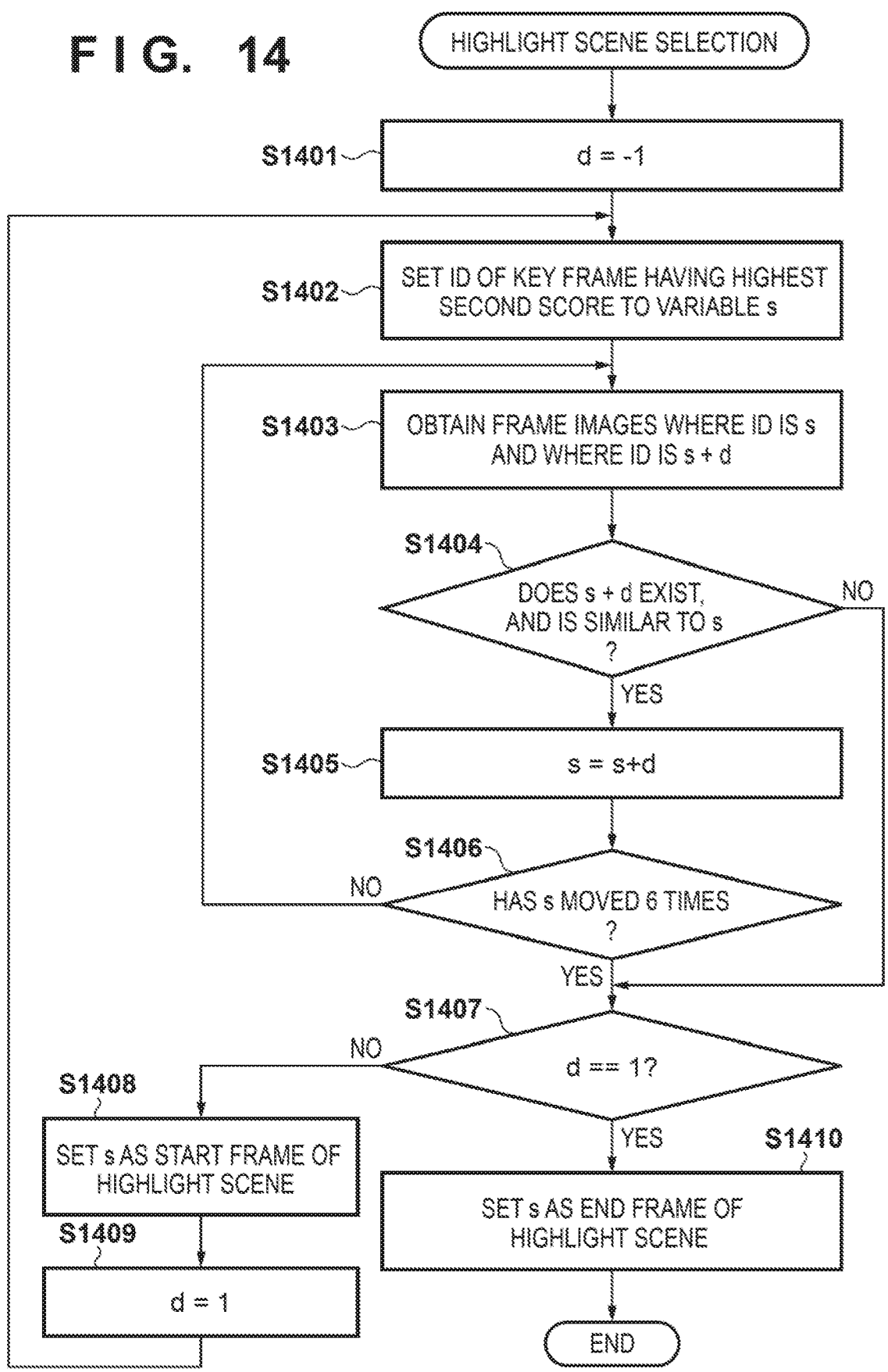
FIG. 14 is a flowchart illustrating processing of step S1301.

FIG. 14 is a flowchart illustrating processing of step S1301 of FIG. 13. In FIG. 14, a start frame and an end frame of a highlight scene are selected, by using information of a key frame. It is assumed below that key frames are set as illustrated in the frame information management table 301 of FIG. 3.

In step S1401, the CPU 101 sets a variable d, which indicates a direction in which frames advance and is reserved in the RAM 102 as −1. In step S1402, the CPU 101 obtains the ID of a key frame having the highest second score from the frame information management table 301, and sets the value of this ID to a variable s. A description is given later, but, if the variable d is −1, the start frame is searched for by advancing the frame for the variable s in a negative direction, and, if the variable d is 1, the end frame is searched for by advancing the frame for the variable s in a positive direction.

In step S1403, the CPU 101 obtains images for frames where the ID is s and where the ID is s+d, the images being saved in the HDD 109. In step S1404, the CPU 101, by the similarity determination unit 1202, determines whether the frame having the ID of s+d exists, and whether it is similar to the frame having the ID of s. When it is determined that the frame having the ID of s+d is not similar, the processing proceeds to step S1407, and when it is determined that the frame having the ID of s+d is similar, the processing proceeds to step S1405. In the similarity determination, a configuration may be taken so as, for each frame, to obtain a color histogram from a pixel value distribution, and to determine a similarity thereof, for example.

In step S1405, the CPU 101 advances by one in the direction of the variable d by adding d to s. In step S1406, the CPU 101 determines whether s has moved a predetermined number of times, for example, six times, from a position of the key frame, in the direction of the variable d. When it is determined that s has not moved the predetermined number of times, the processing repeats from step S1403. When it is determined that s has moved the predetermined number of times, the processing proceeds to step S1407. Note that a movement amount as the determination criterion is given as a fixed six times here, but, it may be variable, such as by changing a number of frames used in a determination in accordance with the second score of the key frame.

In step S1407, the CPU 101 determines whether the variable d is 1. When it is determined that the variable d is not 1, in step S1408, the CPU 101 sets the frame having the ID of s as the start frame of the highlight scene. In step S1409, the CPU 101 sets the value of the variable d to 1 so that the variable s advances in the positive direction, and repeats the processing from step S1402. When it is determined in step S1407 that the variable d is 1, in step S1410, the CPU 101 sets the frame having the ID of s as the end frame of the highlight scene. After the processing of step S1410, the processing of FIG. 14 ends.

For example, as illustrated in FIG. 3, when the frame of ID 4 of the frame information management table 301 is the frame having the highest second score, the start frame is searched for by performing a similarity determination in a direction where the ID number decreases from ID 4. Then, after the start frame is set, the end frame is searched for by performing a similarity determination in a direction in which the ID number increases from ID 4. Hypothetically, if the frames for ID 9 and ID 10 are not similar, the frames for ID 1 through ID 9 are selected as a highlight scene.

Note that, in the present embodiment, the highlight scene is searched for by having the key frame with the highest second score as a reference, in step S1402. As another method, a configuration may be taken to calculate a score different to the second score such as by adding together first scores of frames before and after a key frame, and a search for a highlight scene by taking a key frame having a highest score as a reference. In addition, in the similarity determination of step S1404, the determination may be performed in accordance with whether a difference of motion amounts used in the second embodiment is greater than a threshold value, and the similarity determination may be performed by another method such as by using a local feature amount obtained by analyzing an image.

In addition, in the present embodiment, key frames are selected by an operation similar to that in the first embodiment, and information of key frames is used to select a highlight scene. However, a configuration may be such that key frames are selected by an operation similar to that in the second embodiment, and information of key frames is used to select a highlight scene.

As explained above, taking a key frame selected in accordance with the first embodiment or the second embodiment as a reference, it is possible to determine the similarity with adjacent frames, and to select a moving image cut at certain times or when the scene greatly changes as a highlight scene.

An explanation has thus been given for each embodiment, but the present invention can have an embodiment as a system, an apparatus, a method, a program, or a recording medium (storage medium), for example. Specifically, the present invention may be applied to a system configured from a plurality of devices (for example, a host computer, an interface device, an image capturing apparatus, a Web application, and the like), and may be applied to an apparatus comprising one device.

In addition, it goes without saying that, the purpose of the present invention is achieved by configuring as follows, that is, supplying a system or an apparatus with a recording medium (or a storage medium) that has recorded program code (a computer program) of software for realizing functions of embodiments that are previously described. It goes without saying that a corresponding storage medium is a computer-readable storage medium. A computer (or a CPU or an MPU) of the system or apparatus then reads out the program code stored in the recording medium, and executes it. In such a case, the program code itself, which is read from the recording medium, realizes the functions of the embodiments previously described, and the recording medium that records the program code configures the present invention.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
   at least one processor causing the information processing apparatus to act as:
   (a) a first obtainment unit configured to execute processing for obtaining a first feature amount for each of a plurality of frames;
   (b) a specification unit configured to specify a priority order of frames for obtaining a second feature amount different from the first feature amount based on the first feature amount obtained by the first obtainment unit;
   (c) a second obtainment unit configured to execute processing for obtaining the second feature amount from a frame in accordance with the specified priority order; and
   (d) a selection unit configured to select, based on the second feature amount obtained by the second obtainment unit, an image processing target frame, wherein the number of frames from which the second feature amount is obtained is fewer than the number of the plurality of frames from which the first feature amount is obtained.

2. The information processing apparatus according to claim 1, wherein the specification unit sorts the frames based on the first feature amount.

3. The information processing apparatus according to claim 2, wherein the specification unit sorts the frames in accordance with a first score obtained from the first feature amount.

4. The information processing apparatus according to claim 1, wherein the at least one processor further causes the information processing apparatus to act as (e) a determination unit configured to determine whether the second feature amount obtained by the second obtainment unit satisfies a condition,
   wherein the selection unit selects a frame determined to satisfy the condition by the determination unit as the image processing target frame.

5. The information processing apparatus according to claim 4, wherein the determination unit determines that a second score that is obtained from the second feature amount and is greater than a threshold value satisfies the condition.

6. The information processing apparatus according to claim 1, wherein the selection unit selects the image processing target frame so as to distribute the image processing target frame in an order of frames.

7. The information processing apparatus according to claim 1, wherein the first feature amount is a feature amount of an object having a predetermined direction, and the second feature amount is a feature amount of an object having a plurality of directions including the predetermined direction.

8. The information processing apparatus according to claim 1, wherein the first feature amount is a parameter added to each of the plurality of frames and is irrespective of an image of a frame, and the second feature amount is a feature amount of an image of the frame.

9. The information processing apparatus according to claim 1, wherein the frames are obtained from moving image data.

10. The information processing apparatus according to claim 1, wherein the image processing is processing for laying out frame images.

11. The information processing apparatus according to claim 1, wherein the image processing is processing for generating a highlight scene.

12. The information processing apparatus according to claim 11, wherein the at least one processor further causes the information processing apparatus to act as (e) a setting unit configured, in an order of the frames, to set, as a frame to use in the highlight scene, a frame similar to the image processing target frame selected by the selection unit, the frame selected by the selection unit being a standard in the setting.

13. The information processing apparatus according to claim 1, wherein an obtainment time for one frame for the second feature amount is longer than that for the first feature amount.

14. The information processing apparatus according to claim 1, wherein the processing for obtaining the second feature amount from the frame is executed until the number of target frames reaches a predetermined number.

15. A method executed by an information processing apparatus, the method comprising:
   executing processing for obtaining a first feature amount for each of a plurality of frames;
   specifying a priority order of frames for obtaining a second feature amount different from the first feature amount based on the obtained first feature amount;
   executing processing for obtaining the second feature amount from a frame in accordance with the specified priority order; and
   selecting an image processing target frame on the basis of the obtained second feature amount, wherein the number of frames from which the second feature amount is obtained is fewer than the number of the plurality of frames from which the first feature amount is obtained.

16. The method according to claim 15, wherein, in the specifying, the frames are sorted based on the first feature amount.

17. The method according to claim 16, wherein the frames are sorted in accordance with a first score obtained from the first feature amount.

18. The method according to claim 15, further comprising determining whether the second feature amount obtained satisfies a condition, wherein a frame determined to satisfy the condition is selected as the image processing target frame.

19. The method according to claim 18, wherein, in the determining, a second score that is obtained from the second feature amount and is greater than a threshold value is determined to satisfy the condition.

20. The method according to claim 15, wherein, in the selecting, the image processing target frame is selected so as to distribute the image processing target frame in an order of frames.

21. The method according to claim 15, wherein the first feature amount is a feature amount of an object having a predetermined direction, and the second feature amount is a feature amount of an object having a plurality of directions including the predetermined direction.

22. The method according to claim 15, wherein the first feature amount is a parameter added to each of the frames and is irrespective of an image of a frame, and the second feature amount is a feature amount of an image of the frame.

23. The method according to claim 15, wherein the frames are obtained from moving image data.

24. The method according to claim 15, wherein the image processing is processing for laying out frame images.

25. The method according to claim 15, wherein an obtainment time for one frame for the second feature amount is longer than that for the first feature amount.

26. The method according to claim 15, wherein the processing for obtaining the second feature amount from the frame is executed until the number of target frames reaches a predetermined number.

27. A method executed by an information processing apparatus, the method comprising:
   executing processing for obtaining a first feature amount for each of frames in each of sections divided;
   executing processing for obtaining a second feature amount different from the first feature amount for a portion of the frames included in each of the sections;
   specifying, in each of the sections, candidate frames for obtaining the second feature amount, based on the obtained first feature amount and the second feature amount obtained from the portion of the frames, wherein the number of the candidate frames is fewer than the number of the frames;
   executing processing for obtaining the second feature amount from the candidate frames; and
   selecting an image processing target frame based on the second feature amount of the candidate frames.

* * * * *